(12) United States Patent
Herndon

(10) Patent No.: US 6,948,854 B2
(45) Date of Patent: Sep. 27, 2005

(54) FLUID DYNAMIC BEARING MOTOR OPTIMIZED FOR RADIAL STIFFNESS AND POWER CONSUMPTION

(75) Inventor: Troy Michael Herndon, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 99 days.

(21) Appl. No.: 10/734,007

(22) Filed: Dec. 10, 2003

(65) Prior Publication Data

US 2004/0208405 A1 Oct. 21, 2004

Related U.S. Application Data

(60) Provisional application No. 60/463,425, filed on Apr. 15, 2003.

(51) Int. Cl.[7] .............................................. F16C 32/06
(52) U.S. Cl. ...................................... 384/114; 384/107
(58) Field of Search ................................ 384/100, 107, 384/111–123; 310/90; 360/99.08, 98.07

(56) References Cited

U.S. PATENT DOCUMENTS

| 4,919,547 | A |   | 4/1990  | Schwartzman |
|---|---|---|---|---|
| 5,328,272 | A |   | 7/1994  | Ainslie |
| 5,487,608 | A |   | 1/1996  | Leuthold |
| 5,683,183 | A | * | 11/1997 | Tanaka et al. ............. 384/100 |
| 6,502,990 | B2 | * | 1/2003 | Narita ........................ 384/100 |
| 6,741,001 | B2 | * | 5/2004 | Takayanagi ................. 310/90 |
| 6,877,902 | B2 | * | 4/2005 | Ikegawa ..................... 384/114 |
| 6,890,104 | B2 | * | 5/2005 | Gomyo et al. .............. 384/119 |

* cited by examiner

*Primary Examiner*—Thomas R. Hannon

(57) ABSTRACT

A variable-gap fluid dynamic bearing motor assembly is described. In one embodiment, the assembly includes a hub configured to rotate about a rotational axis and to support at least one disc. The assembly also includes a first member attached to the hub and configured to rotate about the rotational axis and a second member. A first fluid dynamic journal bearing having a first bearing gap and a second fluid dynamic journal bearing having a second bearing gap are disposed between the first member and the second member. The bearing gaps are configured such that the second bearing gap is larger than the first bearing gap. Bearing fluid disposed within the first fluid dynamic journal bearing and the second fluid dynamic journal bearing to support the relative rotation of the first member and the second member.

20 Claims, 4 Drawing Sheets

FLUID DYNAMIC BEARING MOTOR OPTIMIZED FOR RADIAL STIFFNESS AND POWER CONSUMPTION

CROSS-REFERENCE TO RELATED APPLICATION

This application relates to, and claims the priority benefit of, U.S. Provisional patent application Ser. No. 60/463,425, titled "Multi-Journal Gap Motor," filed on Apr. 15, 2003. The subject matter of the related application is hereby incorporated by reference.

BACKGROUND OF THE INVENTION

1. Field of the Invention

This invention relates generally to fluid dynamic bearing motors and more specifically to a fluid dynamic bearing motor optimized for radial stiffness and power consumption.

2. Description of the Background Art

FIG. 1 is an exploded perspective view illustrating a prior art disc drive 100. As shown, disc drive 100 may include, without limitation, a housing 105, a shaft 130, discs 135 and a suspension arm assembly 150. Housing 105 includes a base 110 that is attached to a cover 115. In addition, a seal 120 may be disposed in between base 110 and cover 115. Discs 135, which have surfaces 140 covered with a magnetic media configured to store information magnetically, are attached to shaft 130. During operation, suspension arm assembly 150 is configured to suspend read/write heads 145 above surfaces 140 as a spindle motor (not shown) rotates discs 135 about shaft 130 at high speed. Suspension arm assembly 150 is further configured to move read/write heads 145 radially across surfaces 140 to position read/write heads 145 above different radially spaced tracks (not shown) disposed on surfaces 140 where magnetically encoded information may be stored within the magnetic media. Once positioned, read/write heads 145 may either read magnetically encoded information from or write magnetically encoded information to the magnetic media at selected locations.

FIG. 2 is a cross-sectional view illustrating a prior art constant-gap fluid dynamic bearing motor assembly 200. Fluid dynamic bearing motors, such as constant-gap fluid dynamic bearing motor assembly (hereinafter "constant-gap FDB motor assembly") 200, oftentimes are used in precision-oriented electronic devices to achieve better performance. For example, using a fluid dynamic bearing motor in a disc drive, such as disc drive 100 described above in conjunction with FIG. 1, results in more precise alignment between the tracks of the discs and the read/write heads. More precise alignment, in turn, allows discs to be designed with greater track densities, thereby decreasing the size of the discs and/or increasing the storage capacity of the discs.

As shown, constant-gap FDB motor assembly 200 includes, without limitation, a rotational assembly 201 and a sleeve 206. Rotational assembly 201 generally comprises the rotating elements of constant-gap FDB motor assembly 200. In the configuration shown, rotational assembly 201 includes, without limitation, a hub 202, a shaft 204 and discs 208.

Shaft 204 is attached to hub 202 and provides axial support for constant-gap FDB motor assembly 200. Hub 202 is configured to rotate about a rotational axis 205. Specifically, a magnet assembly (not shown) is attached to hub 302, and the electromagnetic interaction between that magnet assembly and a stator assembly (also not shown) causes hub 202 to rotate. As shaft 204 is attached to hub 202, shaft 204 rotates about rotational axis 205 as well. Discs 208 are coupled to the outside of hub 202 and thus also rotate about rotational axis 205 with hub 202. Sleeve 206 is configured to remain stationary.

Constant-gap FDB motor assembly 200 also includes fluid dynamic journal bearings 210 and 214 and fluid dynamic thrust bearings 218 and 220. Fluid dynamic journal bearings 210 and 214 are disposed between sleeve 206 and shaft 204. Fluid dynamic journal bearing 210 is configured with a bearing length 211 and a bearing gap 212, and fluid dynamic journal bearing 214 is configured with a bearing length 215 and a bearing gap 216. As configured, bearing gap 212 and bearing gap 216 are the same size. Fluid dynamic thrust bearings 218 and 220 are disposed between sleeve 206 and the facing surfaces of a flange 219 of shaft 204. Each of fluid dynamic journal bearings 210 and 214 and fluid dynamic thrust bearings 218 and 220 includes at least one bearing surface having a grooved bearing pattern. As is commonly known in the art, these grooved bearing patterns are configured to generate a localized high pressure region within the bearing fluid that supports the relative rotation of the surfaces of fluid dynamic bearing.

As FIG. 2 also shows, a center of gravity 222 of rotational assembly 201 is disposed between fluid dynamic journal bearings 210 and 214. Ideally, center of gravity 222 should be disposed equidistant from fluid dynamic journal bearings 210 and 214 along rotational axis 205 such that fluid dynamic journal bearings 210 and 214 equally support the radial load generated by the rotation of rotational assembly 201 about rotational axis 205. If, however, center of gravity 222 is disposed closer to one of fluid dynamic journal bearings 210 or 214, then that fluid dynamic journal bearing supports a greater radial load than the other fluid dynamic journal bearing. Such a load imbalance, if left unchecked, typically increases the operational vibration and non-repetitive run-out of constant-gap FDB motor assembly 200, thereby decreasing performance.

To compensate for such a load imbalance, the radial stiffness of the fluid dynamic journal bearing disposed closest to center of gravity 222 oftentimes is increased. Increasing the stiffness of a fluid dynamic journal bearing typically is accomplished by increasing the length of that fluid dynamic journal bearing. For example, suppose that center of gravity 222 is disposed along rotational axis 205 closer to fluid dynamic journal bearing 210 than to fluid dynamic journal bearing 214 such that fluid dynamic journal bearing 210 supports a greater radial load than fluid dynamic journal bearing 214. To compensate for the load imbalance, the radial stiffness of fluid dynamic journal bearing 210 is increased relative to that of fluid dynamic journal bearing 214 by increasing bearing length 211 relative to bearing length 215.

One drawback of this approach to tuning radial stiffness is that the radial stiffness and the power consumption of a fluid dynamic journal bearing are both equally sensitive to a change in bearing length. Thus, increasing the bearing length of a fluid dynamic journal bearing to increase radial stiffness results in a proportional increase in power consumption.

Another drawback of this tuning approach is that, although fluid dynamic journal bearing 214 ends up having less radial stiffness than fluid dynamic journal bearing 210 because bearing length 215 is shorter than bearing length 211, the radial stiffness of fluid dynamic journal bearing 214 nonetheless is oftentimes too great in relation to the smaller radial load that fluid dynamic journal bearing 214 supports. Such an over-design needlessly increases the power consumption of fluid dynamic journal bearing 214 and, thus, constant-gap FDB motor assembly 200.

SUMMARY OF THE INVENTION

One embodiment of a variable-gap fluid dynamic bearing motor assembly includes a hub that is configured to rotate about a rotational axis and to support at least one disc. The assembly also includes a first member that is attached to the hub and configured to rotate about the rotational axis and a second member. A first fluid dynamic journal bearing having a first bearing gap and a second fluid dynamic journal bearing having a second bearing gap are disposed between the first member and the second member. The bearing gaps are configured such that the second bearing gap is larger than the first bearing gap. Bearing fluid disposed within the first fluid dynamic journal bearing and the second fluid dynamic journal bearing to support the relative rotation of the first member and the second member.

A variable-gap fluid dynamic bearing motor assembly with such a configuration is preferably used when the center of gravity of a rotational assembly is disposed closer to the first fluid dynamic journal bearing than to the second fluid dynamic journal bearing. One advantage of using a variable-gap fluid dynamic motor assembly with the disclosed configuration is that the relative sizes of the first bearing gap and the second bearing gap may be selected to optimize the power consumption of the fluid dynamic journal bearings relative to the operational vibration and non-repetitive runout of the overall motor assembly.

DETAILED DESCRIPTION OF THE INVENTION

Figure 1:
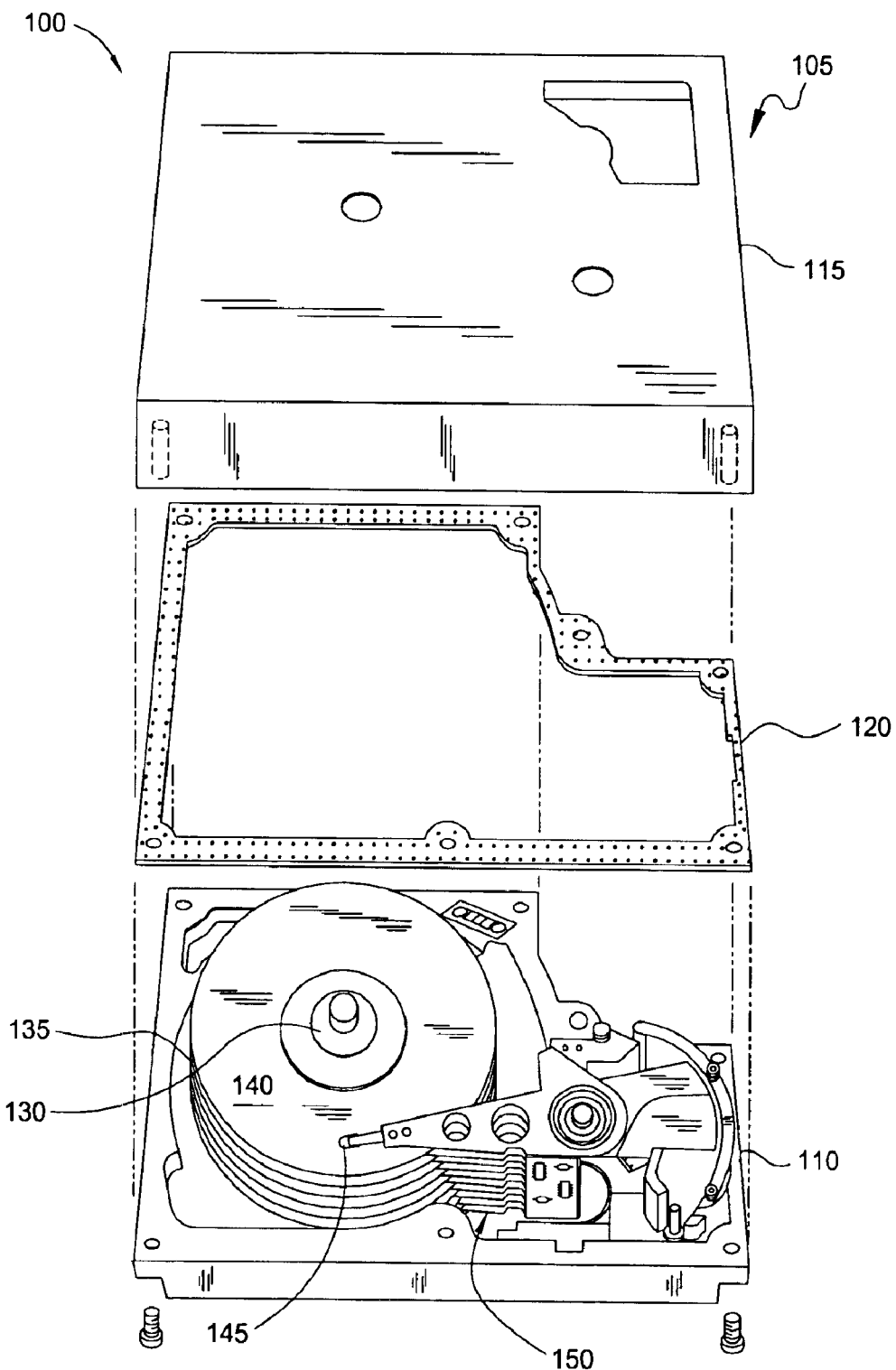
FIG. 1 is an exploded perspective view illustrating a prior art disc drive.
Figure 2:
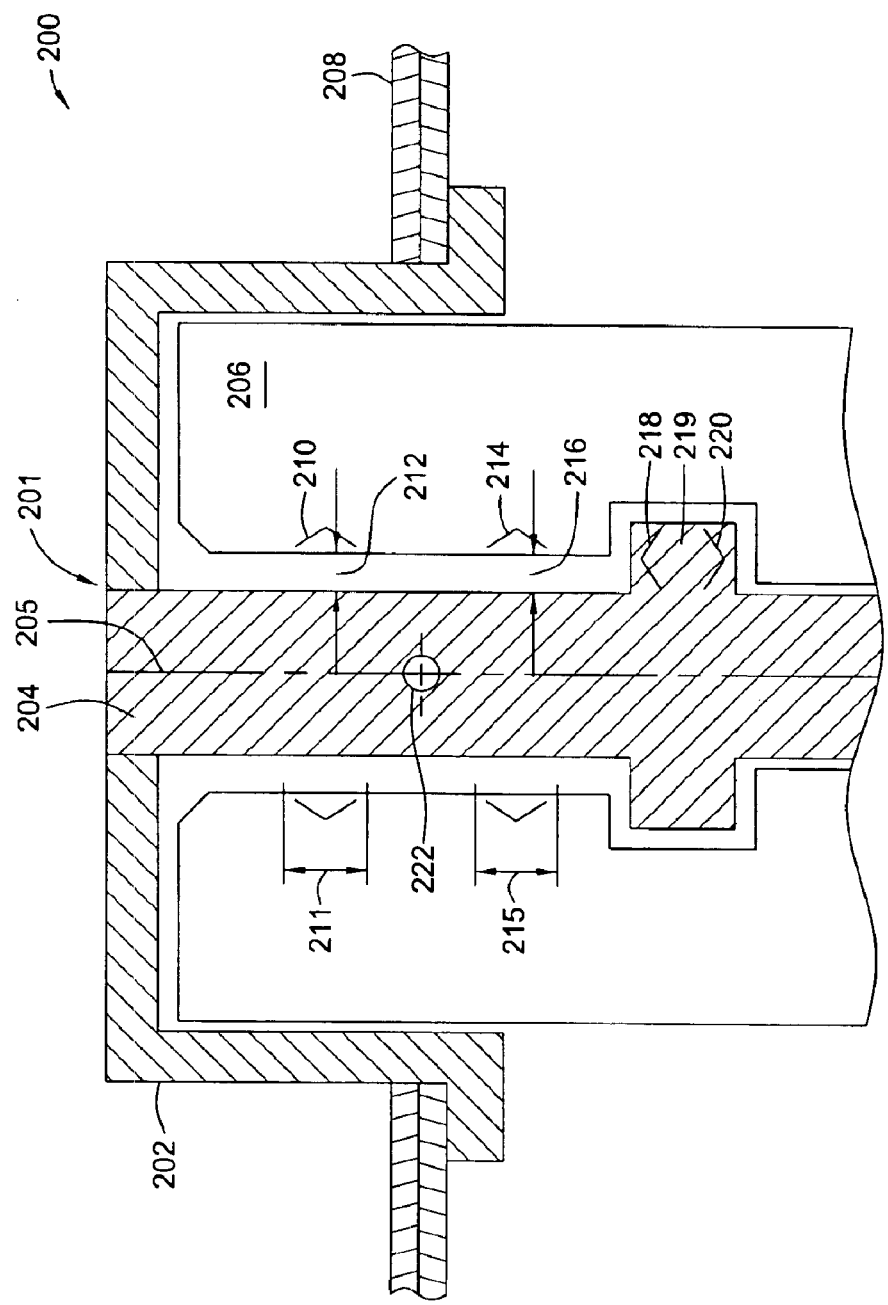
FIG. 2 is a cross-sectional view illustrating a prior art fluid dynamic bearing motor assembly.
Figure 3:
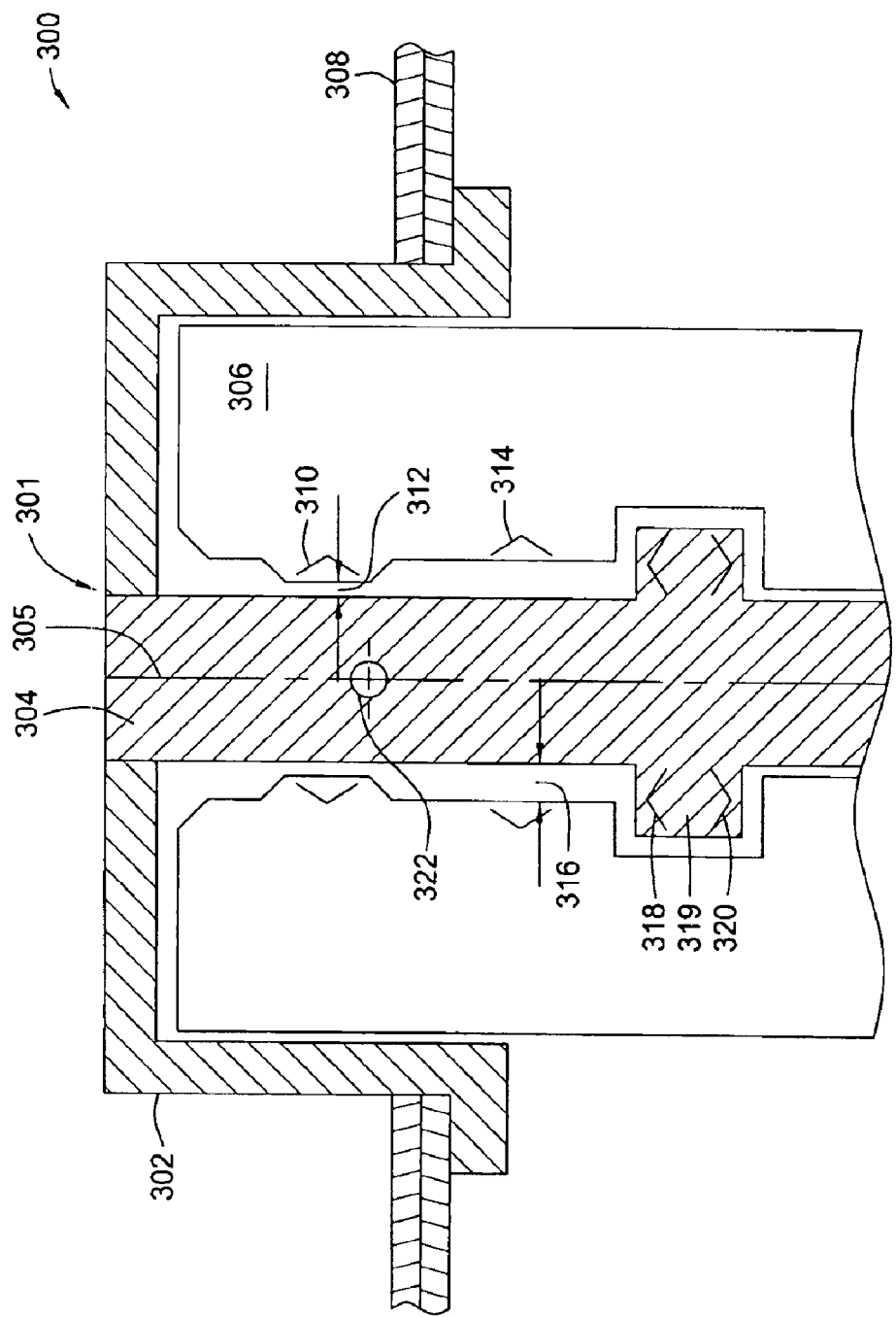
FIG. 3 is a cross-sectional view illustrating a variable-gap fluid dynamic bearing motor assembly, according to one embodiment of the invention.

FIG. 3 is a cross-sectional view illustrating a variable-gap fluid dynamic bearing motor assembly 300, according to one embodiment of the invention. As shown, variable-gap fluid dynamic bearing motor assembly (hereinafter "variable-gap FDB motor assembly") 300 may include, without limitation, a rotational assembly 301 and a sleeve 306. Rotational assembly 301 generally comprises the rotating elements of variable-gap FDB motor assembly 300. In the configuration shown, rotational assembly 301 includes, without limitation, a hub 302, a shaft 304 and discs 308.

Shaft 304 is attached to hub 302 and provides axial support for variable-gap FDB motor assembly 300. Hub 302 is configured to rotate about a rotational axis 305. Again, a magnet assembly (not shown) is attached to hub 302, and the electromagnetic interaction between that magnet assembly and a stator assembly (also not shown) causes hub 302 to rotate. As shaft 304 is attached to hub 302, shaft 304 rotates about rotational axis 305 as well. Discs 308 are coupled to the outside of hub 302 and thus also rotate about rotational axis 305 with hub 302. Sleeve 306 is configured to remain stationary.

Persons skilled in the art will recognize that in alternative embodiments, different elements of variable-gap FDB motor assembly 300 may rotate or remain stationary. For example, in one alternative embodiment, shaft 304 may be configured to remain stationary, and sleeve 306 may be attached to hub 302 and configured to rotate about rotational axis 305. Rotational assembly 301 may then include, without limitation, hub 302, sleeve 306 and discs 308. Persons skilled in the art will therefore recognize that the various combinations of rotating and stationary elements in no way limit the scope of the invention.

Variable-gap FDB motor assembly 300 also includes fluid dynamic journal bearings 310 and 314 and fluid dynamic thrust bearings 318 and 320. Fluid dynamic journal bearings 310 and 314 are disposed between sleeve 306 and shaft 304. Fluid dynamic journal bearing 310 is configured with a bearing gap 312, and fluid dynamic journal bearing 314 is configured with a bearing gap 316. Fluid dynamic thrust bearings 318 and 320 are disposed between sleeve 306 and the facing surfaces of a flange 319 of shaft 304. Each of fluid dynamic journal bearings 310 and 314 and fluid dynamic thrust bearings 318 and 320 includes at least one bearing surface having a grooved bearing pattern. As is commonly known in the art, these grooved bearing patterns are configured to generate a localized high pressure region within the bearing fluid when the surfaces of fluid dynamic bearing rotate relative to one another. Thus, as hub 302 and shaft 304 rotate about rotational axis 305, the high pressure regions generated locally to fluid dynamic journal bearings 310 and 314 provide radial support between shaft 304 and sleeve 306. Likewise, as hub 302 and shaft 304 rotate about rotational axis 305, the high pressure regions generated locally to fluid dynamic thrust bearings 318 and 320 provide axial support between flange 319 and sleeve 306.

The grooved bearing surfaces of fluid dynamic journal bearings 310 and 314 and fluid dynamic thrust bearings 318 and 320 may include any suitable type of grooved bearing pattern, including, without limitation, a pattern of spiral grooves or a pattern of chevron grooves. Further, as persons skilled in the art will recognize, any of shaft 304, flange 319 or sleeve 306 may include one or more bearing surfaces having a grooved bearing pattern.

As FIG. 3 also shows, a center of gravity 322 of rotational assembly 301 is disposed along rotational axis 305 closer to fluid dynamic journal bearing 310 than to fluid dynamic journal bearing 314. Thus, fluid dynamic journal bearing 310 supports a greater radial load than fluid dynamic journal bearing 314. To compensate for this load imbalance, fluid dynamic journal bearing 310 is configured with more radial stiffness than fluid dynamic journal bearing 314. More specifically, fluid dynamic journal bearings 310 and 314 are configured such that bearing gap 312 is smaller than bearing gap 316. As persons skilled in the art will understand, the radial stiffness of a fluid dynamic journal bearing is a function of, among other things, the inverse of the bearing gap size raised to the third power. Decreasing the size of bearing gap 312 relative to the size of bearing gap 316 therefore substantially increases the stiffness of fluid dynamic journal bearing 310 relative to that of fluid dynamic journal bearing 314. The greater stiffness allows fluid dynamic journal bearing 310 to accommodate the greater load. As persons skilled in the art also will understand, the power consumption of a fluid dynamic bearing is proportional to the inverse of bearing gap size, making power consumption less sensitive to a change in bearing gap size than radial stiffness. Thus, while decreasing the relative size of bearing gap 312 substantially increases the radial stiffness of fluid dynamic journal bearing 310, the decrease causes a disproportionately smaller increase in the power consumed by fluid dynamic journal bearing 310.

In addition to the foregoing, persons skilled in the art will recognize that bearing gap 316 may be selected such that fluid dynamic journal bearing 314 is not over-designed for the actual radial load that fluid dynamic journal bearing 314 supports. By sizing bearing gap 316 to create an appropriate amount of radial stiffness, fluid dynamic journal bearing 314 not only consumes less power than fluid dynamic journal bearing 310 but also consumes an optimal amount of power in relation to the radial load that fluid dynamic journal bearing 314 supports.

The foregoing indicates that by designing variable-gap FDB motor assembly 300 such that fluid dynamic journal bearings 310 and 314 have different sized bearing gaps 312 and 316, respectively, one may tune variable-gap FDB motor assembly 300 to optimize both stiffness and power consumption simultaneously. First, the performance of variable-gap FDB motor assembly 300, in terms of operational vibration and non-repetitive run-out ("NRR"), is a function of the location of a center of gravity 322 of rotational assembly 301. More specifically, the radial load imbalance resulting from center of gravity 322 being disposed closer to fluid dynamic journal bearing 310 than to fluid dynamic journal bearing 314 increases both the operational vibration and NRR of variable-gap FDB motor assembly 300. Increasing the relative stiffness of fluid dynamic bearing 310, by decreasing the size of bearing gap 312 relative to bearing gap 316, to address this load imbalance therefore decreases both the operational vibration and NRR of variable-gap FDB motor assembly 300.

Second, persons skilled in the art will understand that (i) radial stiffness is more sensitive to a change in bearing gap size than to a change in bearing length, (ii) radial stiffness is more sensitive than power consumption to a change in bearing gap size and (iii) radial stiffness and power consumption have the same sensitivity to a change in bearing length. Thus, for a given increase in power consumption, decreasing the size of bearing gap 312 results in a greater increase in the radial stiffness of fluid dynamic journal bearing 310 than increasing the length of fluid dynamic journal bearing 310. In other words, decreasing bearing gap size, as opposed to increasing bearing length, is a more efficient way in terms of power consumption to increase the radial stiffness of a fluid dynamic bearing.

Lastly, because fluid dynamic journal bearing 314 supports less of the radial load than fluid dynamic journal bearing 310, the radial stiffness of fluid dynamic journal bearing has less impact on the performance of variable-gap FDB motor assembly 300 than the radial stiffness of fluid dynamic journal bearing 310. For this reason, fluid dynamic journal bearing 314 may be configured with relatively less radial stiffness than fluid dynamic bearing 310 without having an appreciable negative impact on the performance of variable-gap FDB motor assembly 310. Bearing gap 316 may therefore be sized relatively larger than bearing gap 312 such that fluid dynamic journal bearing 314 has a radial stiffness commensurate with the actual radial load that fluid dynamic journal bearing 314 supports, thereby optimizing the amount of power that fluid dynamic journal bearing 314 consumes during operation.

In sum, by decreasing the size of bearing gap 312 relative to the size of bearing gap 316, variable-gap FDB motor assembly 300 may be configured to optimize radial stiffness and power consumption simultaneously. Increasing the radial stiffness of fluid dynamic journal bearing 310 by decreasing the relative size of bearing gap 312 decreases the operational vibration and NRR of variable-gap FDB motor assembly 300 while causing only a disproportionately smaller increase in power consumption. Further, adjusting bearing gap 316 to ensure that the radial stiffness of fluid dynamic journal bearing 314 is commensurate with the radial load that fluid dynamic journal bearing 314 supports decreases the overall power consumption of variable-gap FDB motor assembly 300.

In other embodiments, center of gravity 322 may be located closer to fluid dynamic journal bearing 314 than to fluid dynamic journal bearing 310. Persons skilled in the art will understand that the same principles and concepts described above apply with equal force to these embodiments. Thus, to optimize radial stiffness and power consumption simultaneously in these embodiments, fluid dynamic journal bearings 310 and 314 would be configured such that bearing gap 312 is larger than bearing gap 316.

Figure 4:
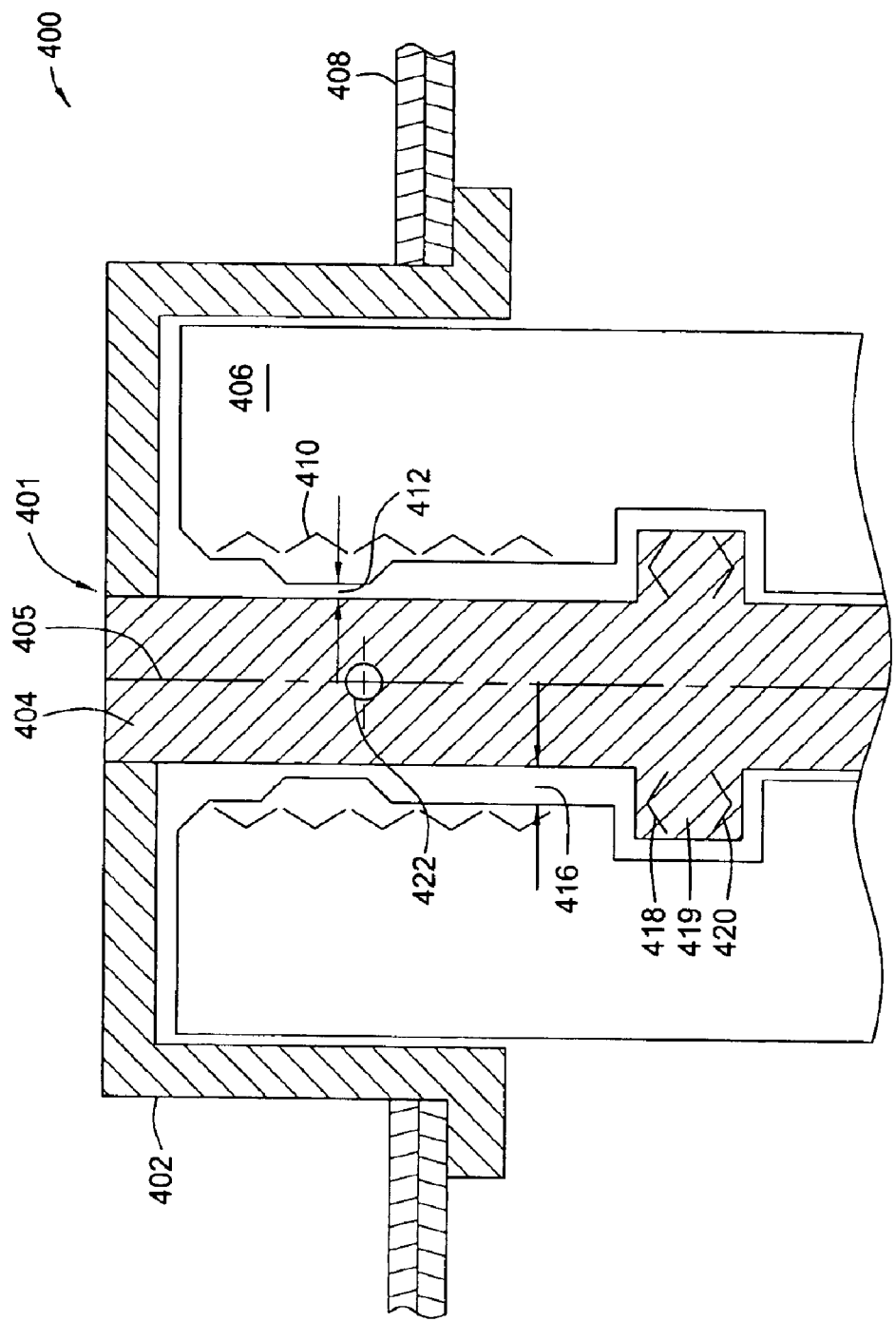
FIG. 4 is a cross-sectional view illustrating a variable-gap fluid dynamic bearing motor assembly, according to an alternative embodiment of the invention.

FIG. 4 is a cross-sectional view illustrating a variable-gap fluid dynamic bearing motor assembly 400, according to an alternative embodiment of the invention. As shown, variable-gap fluid dynamic bearing motor assembly (hereinafter "variable-gap FDB motor assembly") 400 may include, without limitation, a rotational assembly 401 and a sleeve 406. Rotational assembly 401 generally comprises the rotating elements of variable-gap FDB motor assembly 400. In the configuration shown, rotational assembly 401 includes, without limitation, a hub 402, a shaft 404 and discs 408.

Shaft 404 is attached to hub 402 and provides axial support for variable-gap FDB motor assembly 400. Hub 402 is configured to rotate about a rotational axis 405. Again, a magnet assembly (not shown) is attached to hub 402, and the electromagnetic interaction between that magnet assembly and a stator assembly (also not shown) causes hub 402 to rotate. As shaft 404 is attached to hub 402, shaft 404 rotates about rotational axis 405 as well. Discs 408 are coupled to the outside of hub 402 and thus also rotate about rotational axis 405 with hub 402. Sleeve 406 is configured to remain stationary.

Persons skilled in the art will recognize that in alternative embodiments, different elements of variable-gap FDB motor assembly 400 may rotate or remain stationary. For example, in one alternative embodiment, shaft 404 may be configured to remain stationary, and sleeve 406 may be attached to hub 402 and configured to rotate about rotational axis 405. Rotational assembly 401 may then include, without limitation, hub 402, sleeve 406 and discs 408. Persons skilled in the art will therefore recognize that the various combinations of rotating and stationary elements in no way limit the scope of the invention.

Variable-gap FDB motor assembly 400 also includes a fluid dynamic journal bearings 410 and fluid dynamic thrust bearings 418 and 420. Fluid dynamic journal bearing 410 is disposed between sleeve 406 and shaft 404, and fluid dynamic thrust bearings 418 and 420 are disposed between sleeve 406 and the facing surfaces of a flange 419 of shaft 404. Again, the grooved bearing surfaces of fluid dynamic journal bearing 410 and fluid dynamic thrust bearings 418 and 420 may include any suitable type of grooved bearing pattern, including, without limitation, a pattern of spiral grooves or a pattern of chevron grooves. Further, as persons skilled in the art will recognize, any of shaft 404, flange 419 or sleeve 406 may include one or more bearing surfaces having a grooved bearing pattern.

As FIG. 4 also shows, a center of gravity 422 of rotational assembly 401 is disposed along rotational axis 405 closer to a bearing gap 412 of fluid dynamic journal bearing 410 than to a bearing gap 416. Thus, as persons skilled in the art will understand, the upper part fluid dynamic journal bearing 410 near bearing gap 412 supports a greater radial load than the lower part of fluid dynamic journal bearing 410 near bearing gap 416. As described above in conjunction with FIG. 3, to compensate for this load imbalance, which decreases the operational vibration and NRR of variable-gap FDB motor assembly 400, the upper part of fluid dynamic journal bearing 410 is configured with a greater radial stiffness than the lower part of fluid dynamic journal bearing 410. To increase the relative radial stiffness of the upper part of fluid dynamic journal bearing 410, bearing gap 412 is sized relatively smaller than bearing gap 416. Again, increasing the radial stiffness of the upper part of fluid dynamic bearing 410 in this fashion causes a disproportionately smaller increase in the power consumed by fluid dynamic journal bearing 410 because radial stiffness is more sensitive than power consumption to a change in bearing gap size. Further, as also described in conjunction with FIG. 3, adjusting bearing gap 416 to ensure that the radial stiffness of the lower part of fluid dynamic journal bearing 410 is commensurate with the actual radial load that the lower part of fluid dynamic journal bearing 410 supports decreases the overall power consumption of variable-gap FDB motor assembly 400. Thus, by decreasing the size of bearing gap 412 relative to the size of bearing gap 416 and further adjusting the size of bearing gap 416, variable-gap FDB motor assembly 400 may be configured to optimize radial stiffness and power consumption simultaneously.

In other embodiments, center of gravity 422 may be located closer to bearing gap 416 of fluid dynamic journal bearing 410 than to bearing gap 412. Persons skilled in the art will understand that the same principles and concepts described above apply with equal force to those embodiments. Therefore, to optimize radial stiffness and power consumption simultaneously in those embodiments, fluid dynamic journal bearing 410 would be configured such that bearing gap 412 is larger than bearing gap 416.

One advantage of the variable-gap fluid dynamic bearing motor assemblies described above is that, among other things, the relative sizes of the bearing gaps in each assembly may be selected to optimize the power consumption of the fluid dynamic journal bearing(s) relative to the operational vibration and non-repetitive run-out of that assembly.

The invention has been described above with reference to specific embodiments. Persons skilled in the art, however, will understand that various modifications and changes may be made thereto without departing from the broader spirit and scope of the invention as set forth in the appended claims. For example, in alternative embodiments, the variable-gap fluid dynamic bearing motor assembly may include more than two fluid dynamic journal bearings as the same principles and concepts described herein would apply to those embodiments as well. Further, fluid dynamic journal bearings with differing bearing gaps may be implemented in any type of fluid dynamic bearing motor assembly. The configuration of the fluid dynamic motor assembly therefore in no way limits the scope of the invention. In addition, bearing gaps of different sizes may be created in any technically feasible way. For example, in one embodiment, the sleeve of fluid dynamic bearing motor assembly may be machined to create fluid dynamic journal bearings with bearing gaps of different sizes. In an alternative embodiment, the shaft may be machined to create bearing gaps of different sizes. The foregoing description and drawings are, accordingly, to be regarded in an illustrative rather than a restrictive sense.

What is claimed is:

1. A variable-gap fluid dynamic bearing motor assembly, the assembly comprising:
   a hub configured to rotate about a rotational axis and to support at least one disc;
   a first member attached to the hub and configured to rotate about the rotational axis;
   a second member;
   a first fluid dynamic journal bearing disposed between the first member and the second member and having a first bearing gap;
   a second fluid dynamic journal bearing disposed between the first member and the second member and having a second bearing gap, the second bearing gap being larger than the first bearing gap; and
   bearing fluid disposed within the first fluid dynamic journal bearing and the second fluid dynamic journal bearing to support the relative rotation of the first member and the second member.

2. The assembly of claim 1, further comprising at least one disc coupled to the hub, the at least one disc, the hub and the first member being part of a rotational assembly.

3. The assembly of claim 2, wherein a center of gravity of the rotational assembly is disposed closer to the first fluid dynamic journal bearing than to the second fluid dynamic journal bearing.

4. The assembly of claim 1, wherein sizes of the first bearing gap and the second bearing gap are selected to optimize power consumption of the first fluid dynamic journal bearing and the second fluid dynamic journal bearing relative to operational vibration of the assembly.

5. The assembly of claim 1, wherein sizes of the first bearing gap and the second bearing gap are selected to optimize power consumption of the first fluid dynamic journal bearing and the second fluid dynamic journal bearing relative to non-repetitive run-out of the assembly.

6. The assembly of claim 1, wherein the second member is configured to remain stationary.

7. The assembly of claim 6, wherein the first member comprises a shaft and the second member comprises a sleeve.

8. The assembly of claim 6, wherein the first member comprises a sleeve and the second member comprises a shaft.

9. The assembly of claim 1, wherein the assembly is disposed within an electronic device.

10. The assembly of claim 9, wherein the electronic device is a disc drive.

11. A variable-gap fluid dynamic bearing motor assembly, the assembly comprising:
    a hub configured to rotate about a rotational axis and to support at least one disc;
    a first member attached to the hub and configured to rotate about the rotational axis;
    a second member;
    a fluid dynamic journal bearing disposed between the first member and the second member and having a first bearing gap and a second bearing gap, the second bearing gap being larger than the first bearing gap; and
    bearing fluid disposed within the fluid dynamic journal bearing to support the relative rotation of the first member and the second member.

12. The assembly of claim 11, further comprising at least one disc coupled to the hub, the at least one disc, the hub and the first member being part of a rotational assembly.

13. The assembly of claim 12, wherein a center of gravity of the rotational assembly is disposed closer to the first bearing gap than to the second bearing gap.

14. The assembly of claim 11, wherein sizes of the first bearing gap and the second bearing gap are selected to optimize power consumption of the fluid dynamic journal bearing relative to operational vibration of the assembly.

15. The assembly of claim 11, wherein sizes of the first bearing gap and the second bearing gap are selected to optimize power consumption of the fluid dynamic journal bearing relative to non-repetitive run-out of the assembly.

16. The assembly of claim 11, wherein the second member is configured to remain stationary.

17. The assembly of claim 16, wherein the first member comprises a shaft and the second member comprises a sleeve.

18. The assembly of claim 16, wherein the first member comprises a sleeve and the second member comprises a shaft.

19. The assembly of claim 11, wherein the assembly is disposed within an electronic device.

20. The assembly of claim 19, wherein the electronic device is a disc drive.

* * * * *